United States Patent

[11] 3,582,736

| [72] | Inventor | Carl E. Geib, Jr.<br>Stockton, Calif. |
|---|---|---|
| [21] | Appl. No. | 690,206 |
| [22] | Filed | Dec. 13, 1967 |
| [45] | Patented | June 1, 1971 |
| [73] | Assignee | The Ideal Electrican and Manufacturing Company<br>Mansfield, Ohio |

[54] BRUSHLESS SYNCHRONOUS MOTOR CONTROL SYSTEM
26 Claims, 9 Drawing Figs.

| [52] | U.S. Cl. | 318/176,<br>318/183;193 |
|---|---|---|
| [51] | Int. Cl. | H02p 5/28 |
| [50] | Field of Search | 318/167,<br>174, 176, 181, 183, 193 |

[56] References Cited
UNITED STATES PATENTS

| 3,293,518 | 12/1966 | Neumann | 318/193 |
|---|---|---|---|
| 3,449,652 | 6/1969 | Ishizaki | 318/193 |
| 3,098,959 | 7/1963 | Rosenberry | 318/181 |
| 3,100,279 | 8/1963 | Rohner | 318/193 |
| 3,293,518 | 12/1966 | Neumann | 318/193 |
| 3,308,362 | 3/1967 | Neumann | 318/193 |
| 3,350,613 | 10/1967 | Brockman | 318/193 |
| 3,405,338 | 10/1968 | Frola | 318/193 |
| 3,414,788 | 12/1968 | Hoffmann et al. | 318/193 |

Primary Examiner—Oris L. RAder
Assistant Examiner—K. L. Crosson
Attorney—Harness, Dickey & Pierce ABSTRACT: A synchronous brushless motor-exciter set wherein the motor field is supplied with direct current energization from the exciter armature, the exciter armature receiving electrical energy from the field supply electromagnetically from an exciter field. In the brushless set, the exciter armature and motor field are fixedly supported on the rotating member, and the exciter field and field supply are supported on a stationary member. A synchronizer control circuit is mounted on a stationary member to provide control for the application of the field energy to the motor field winding at a preselected degree of slip operation of the synchronous motor.

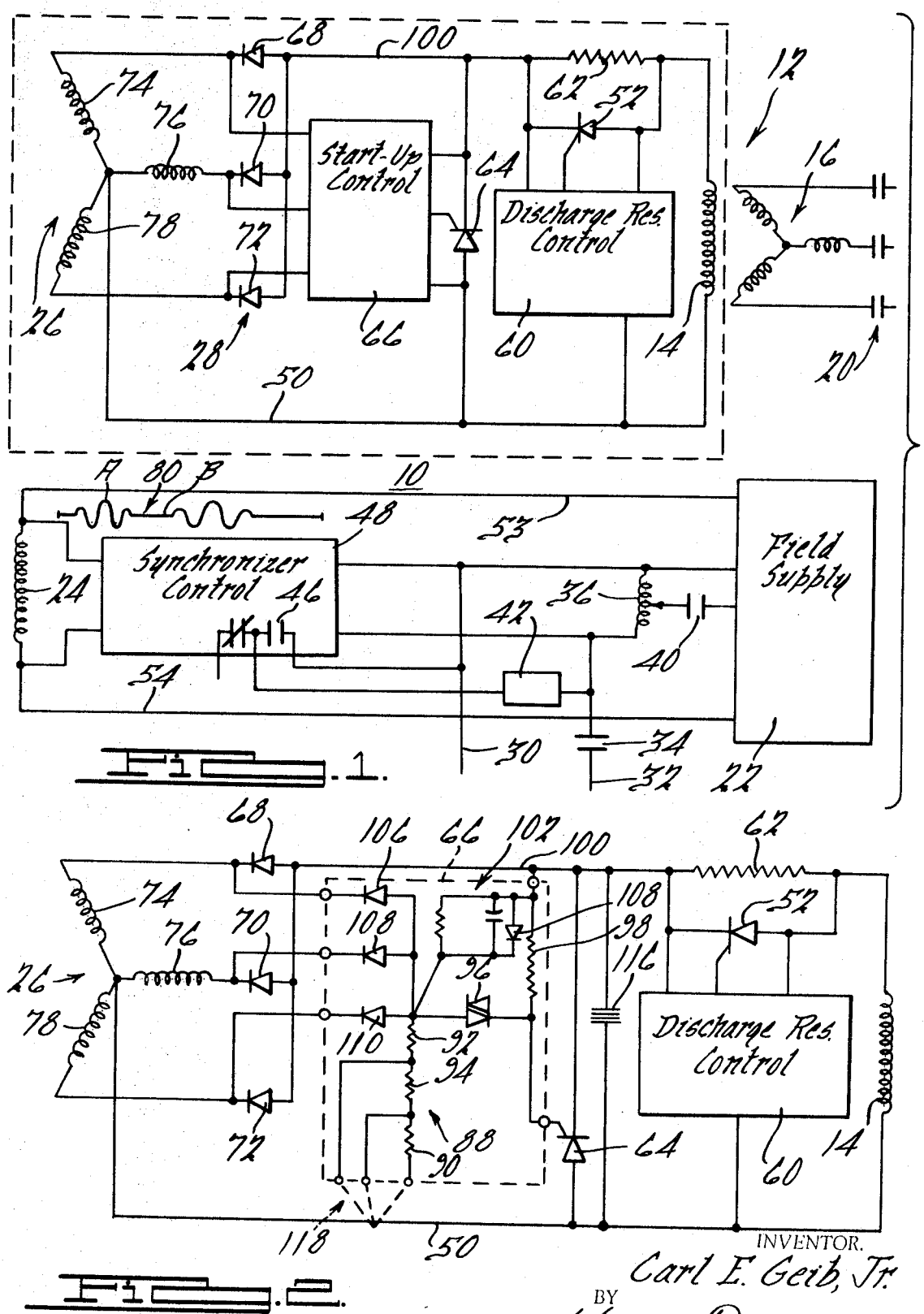

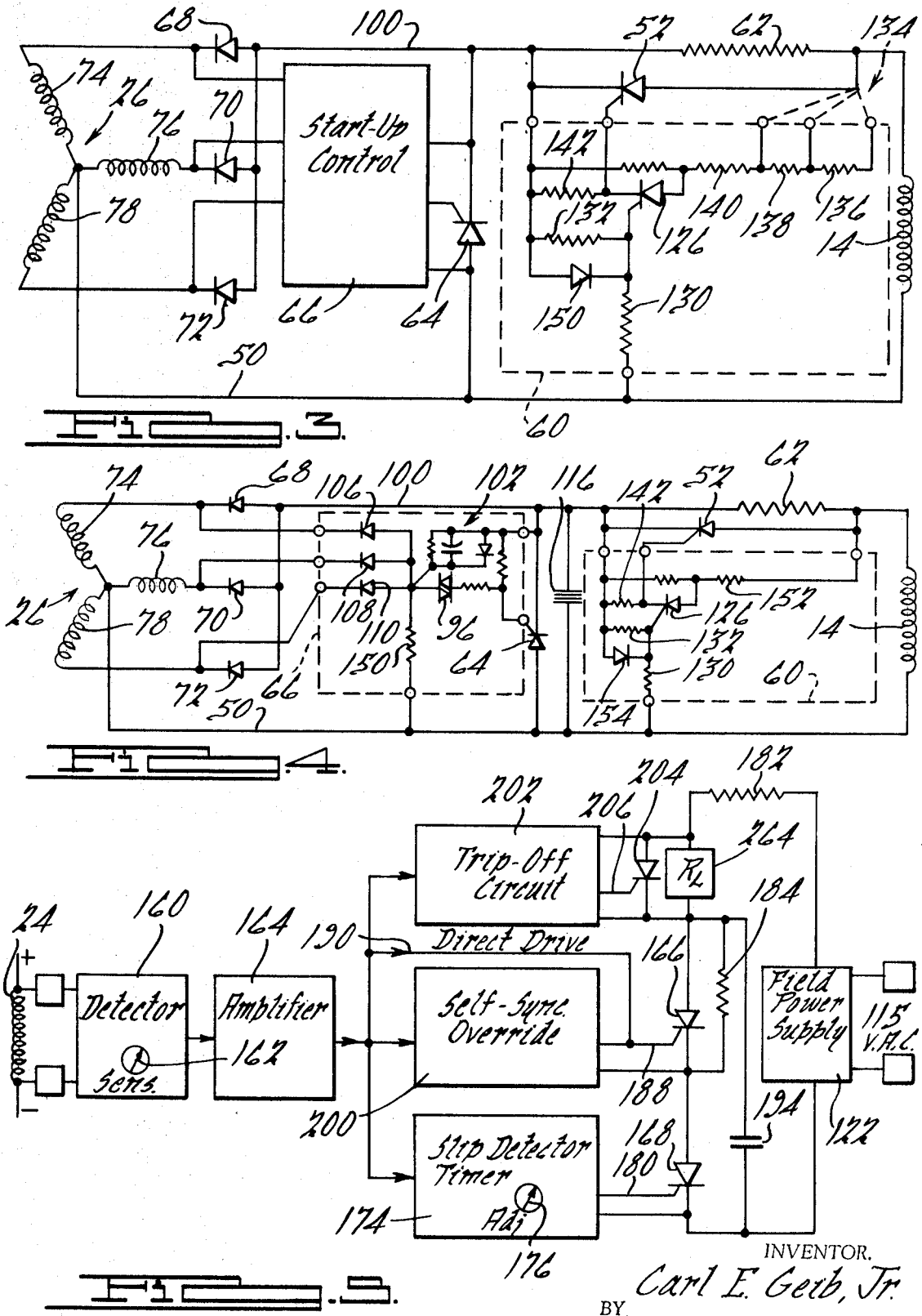

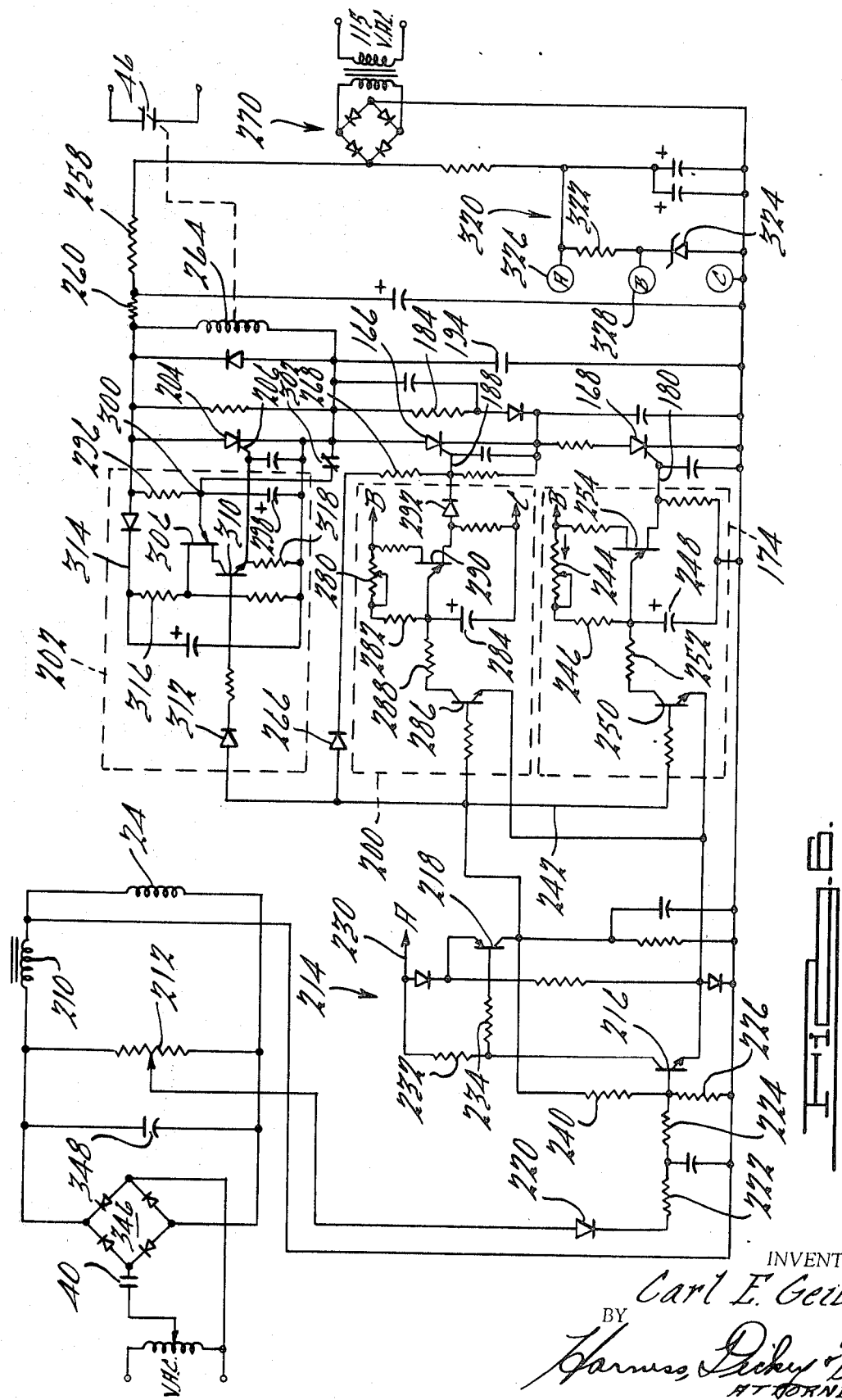

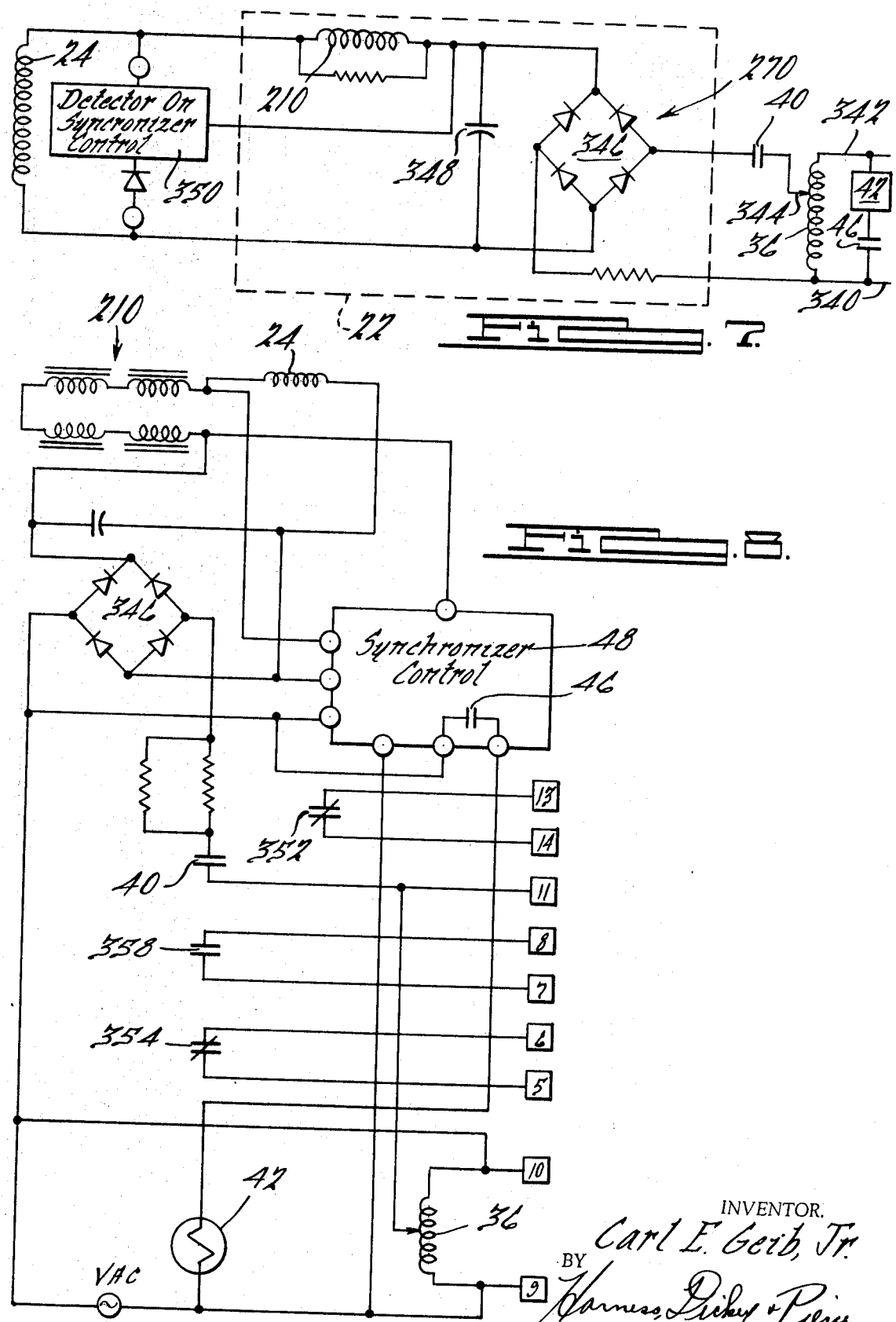

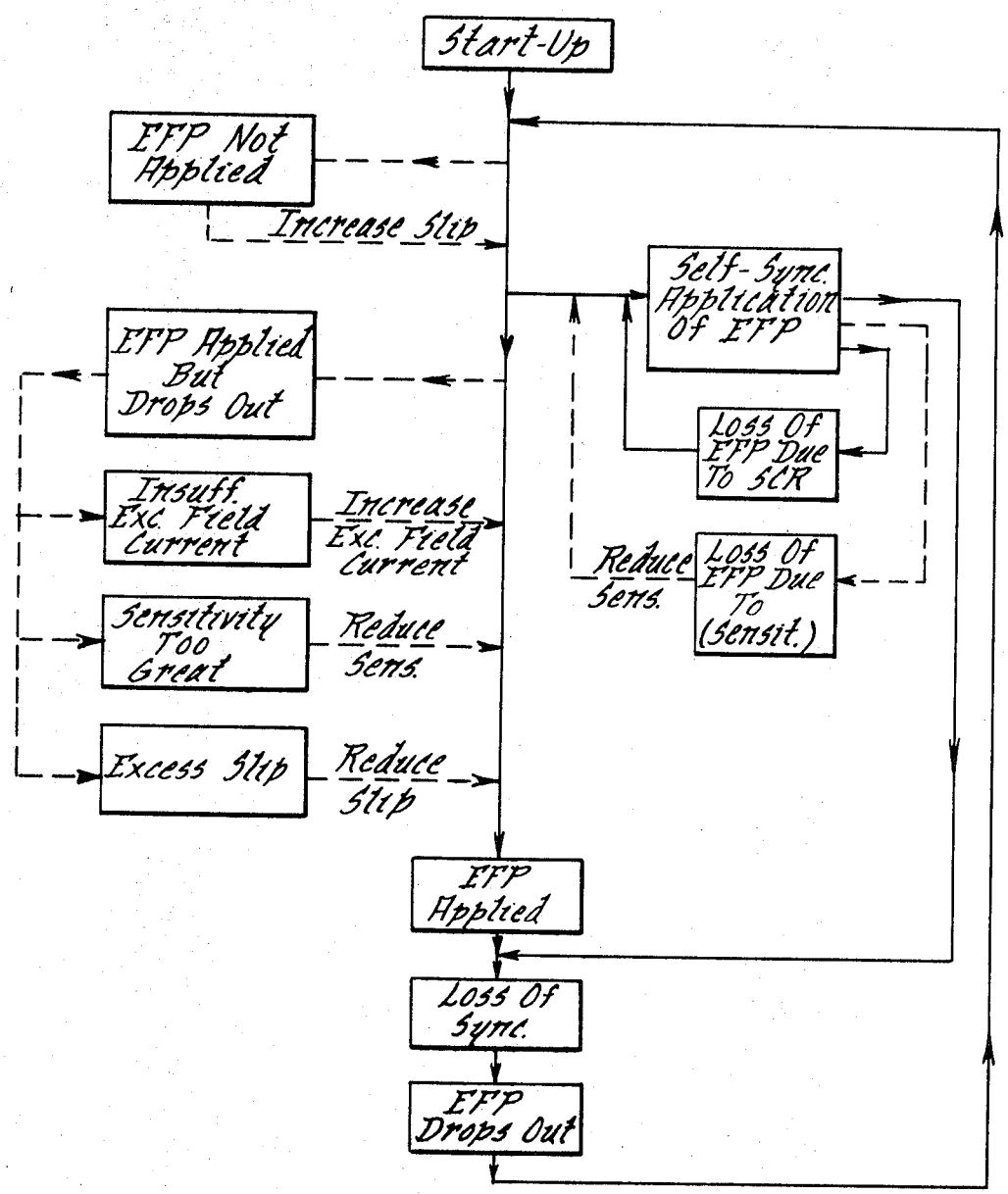

BRUSHLESS SYNCHRONOUS MOTOR CONTROL SYSTEM

BACKGROUND AND SUMMARY OF THE INVENTION

This invention relates generally to a control system for controlling the application of field energy to the motor field winding of a brushless synchronous motor and more particularly to the provision of a stationary mounted synchronizer control circuit for sensing preselected conditions during startup of the brushless synchronous motor to generate a synchronizer signal for controlling the application of field energy to the motor field winding at a preselected degree of slip of the motor field wave relative to the motor armature wave.

Brushless synchronous motors have the inherent advantage of low maintenance and high reliability due to the absence of any sliprings or other relatively rotating parts which are in sliding engagement, one with the other. These characteristics are due to the capability of feeding power to the motor field inductively through an exciter airgap. However, in controlling the operation of the machine, it is necessary to sense certain machine conditions, as for example the slip frequency of the motor, to provide control of the operation of the system. In prior practices, this slip frequency is sensed and the application of the motor field is controlled by a sensing circuit mounted on the rotating member, as for example the rotating shaft. In this arrangement, it is necessary to adjust the pull-in slip frequency of the motor set and the sensitivity of sensing system by bringing the motor up to speed and attempting to pull the motor into synchronism after a "cut-and-try" adjustment of the sensing circuit has been made. If the adjustments of the slip frequency and sensitivity are not proper to effect pull-in, rotation must be stopped in order for the user to effect a further adjustment of the control circuitry on the rotating element.

With the system of the present invention, the control circuits have been placed on a stationary member and the sensing circuit is magnetically coupled to the rotating element to sense the various signals being generated from the synchronous motor prior to pull-in. Accordingly, if the adjustments are not properly made to effect pull-in, the controls are devised to readjust the slip frequency and/or sensitivity while the motor is rotating. Also, normal or abnormal conditions of the system may be sensed and easily displayed or utilized by means of the stationary control circuit. In this way an abnormal indication of motor operation may be displayed to indicate to the user that the machine should be shut down, or automatic shutdown may be effected by the indicating signal.

Accordingly, it is one object of the present invention to provide a brushless motor unit with improved control features.

It is another object of the present invention to provide an improved system for sensing the operating characteristics of a motor.

It is still another object of the present invention to provide a brushless motor unit which is capable of being adjusted as to pull-in slip frequency and sensitivity while the motor is rotating.

It is still another object of the present invention to provide a system for sensing the slip frequency of a brushless synchronous motor utilizing the inductive coupling path through the exciter generator.

It is still a further object of the present invention to provide an improved system for insuring that the motor field is applied on the proper pole during startup of a brushless synchronous motor unit.

It is still another object of the present invention to provide an improved system for sensing an abnormal condition in the operation of a brushless synchronous motor and automatically deenergizing the motor field upon the sensing of the abnormal condition.

It is a further object of the present invention to provide an improved system for attempting to reapply the motor field in a brushless synchronous motor unit upon the sensing of an abnormal condition in the operation of the brushless unit.

Further objects, features and advantages of this invention will become apparent from a consideration of the following description, the appended claims and the accompanying drawings in which:

FIG. 1 is a schematic block diagram illustrating a preferred form of control system for a brushless synchronous motor and incorporating the features of the present invention;

FIG. 2 is a schematic block diagram of the rotating circuitry of FIG. 1 and particularly illustrating the circuit elements of the startup control circuit;

FIG. 3 is another schematic diagram of the rotating circuitry and particularly illustrating the circuit details of the discharge resistance control circuit;

FIG. 4 is a schematic diagram illustrating the circuit details illustrated in FIGS. 2 and 3 as interconnected in a complete system and eliminating the exciter voltage selectivity feature of FIGS. 2 and 3;

FIG. 5 is a block diagram of the stationary portion of the system of FIG. 1 and particularly illustrating the subsystem features of the synchronizer control portion thereof;

FIG. 6 is a schematic diagram illustrating the specific circuit elements of the synchronizer control of FIG. 5;

FIG. 7 is a schematic diagram illustrating the circuit details of the stationary field power supply and the various interconnections thereof;

FIG. 8 is a schematic diagram of the stationary portion of the circuitry of FIG. 1 and particularly illustrating the auxiliary output circuits thereof; and FIG. 9 is a flow block diagram illustrating the operating sequence of the system of FIGS. 1 to 8.

The primary purpose of a brushless synchronous motor control system is to eliminate the sliprings and brushes of the conventional synchronous motor while maintaining control of the operation of the synchronous motor and the energy being fed thereto. The aforementioned control automatically and reliably performs the functions that are performed manually or electromechanically on a conventional synchronous motor. These specific functions are: (a) short the motor field during startup; (b) apply excitation to the motor; (c) remove excitation when motor pulls out of slip; and (d) remove the field discharge resistor after startup is complete.

The control system of the present invention is separable into two separate groups, that is, the rotating portion of the control system and the nonrotating portion. The circuits are operated in two separate modes of operation, that is, the startup mode wherein intelligence signals are transferred from the rotating circuit to the nonrotating circuit by way of magnetic coupling between the exciter armature and exciter field, and the second mode involves the transfer of energy from the nonrotating circuit to the rotating circuit to provide field energization for the synchronous motor. During the startup portion of the motor operation, the motor field is shorted and the synchronous motor is operated as an induction motor to bring the rotor portion thereof up to or very close to synchronous speed.

During one-half cycle of motor field current during the induction motor operation, the current is permitted to flow through the exciter armature, the signal generated thereby being magnetically coupled to the exciter field. During the opposite half cycle, the current is shorted through a controlled device such that a zero output signal appears across the exciter airgap. It is to be noted that the frequency of the current flowing in the rotating circuitry during this induction motor operation is directly proportional to the slip frequency, and the period of the output portion of the signal discussed above is equal to one-half of the slip frequency period. Thus, this zero signal is indicative of the instantaneous slip frequency of the motor during the induction motor operation.

During startup, the synchronizer control is utilized to compare the slip frequency being sensed through the exciter magnetic circuit to a preselected slip frequency and this comparison is utilized in the synchronizer control to apply field energy to the exciter, and therefore excitation energy to the motor field, when the preselected slip is achieved.

The system includes a provision for applying the motor field excitation energy during the proper half cycle or when the proper polarity pole is presented to the motor field windings. If the wrong pole is presented and motor field energy is applied, the system will sense this polarity condition and deenergize the exciter field to remove excitation energy from the motor field. Similarly, the synchronizer control will detect an out-of-step condition in the synchronous motor after exciter voltage has been applied, as for example when the synchronous motor slips a pole due to motor overload or insufficient exciter energy. In both cases, a transient current condition is transmitted from the exciter armature to the exciter field and this transient condition is detected by the synchronizer control. The synchronizer control then opens the AC source to the field supply to deenergize the exciter and thus the motor field winding.

Also, a provision has been made to apply energy to the exciter, and thus the motor field, in the situation where the synchronous motor pulls into synchronism (self-sync) before the synchronizer control has applied field energy to the exciter. In this situation, the synchronizer permits a lapse of approximately 5 seconds, in the preferred embodiment, after the last slip frequency pulse was sensed and applied field energy to the exciter.

Referring now to the drawings and particularly to FIG. 1 thereof, there is illustrated a preferred brushless synchronous motor control system 10 which may be utilized in carrying out the principles of the present invention. The system 10 includes a synchronous motor 12 having a field winding 14 and a three phase armature winding 16, the latter of which is supplied with three phase alternating current energy through a plurality of circuit breakers 20. The field winding 14 is supplied with direct current energy controlled by a field supply circuit 22 through an exciter field winding 24, an exciter armature winding 26 magnetically coupled therewith, and a half wave rectifying system 28. Accordingly, when the armature winding 16 is supplied with energy from the three phase source and the field supply circuit is energized to provide exciter current, the system is capable of operating as a brushless synchronous motor, and will so operate if certain other preselected conditions prevail.

The field supply circuit 22 is provided with a source of alternating current electrical energy from a pair of conductors 30, 32 through a main motor breaker contact 34 and a variac circuit 36 including a tap connection connected to the field supply circuit through a pair of normally open contacts 40. Thus, with main motor breaker contacts 34 closed, the field supply circuit 22 is only provided with electrical energy at such time as the contacts 40 are also closed. The contacts 40 are connected in magnetic circuit with and controlled by a relay coil 42. The coil 42 is supplied with electrical energy from the alternating current source at conductors 30, 32 and is controlled by a normally open set of contacts 46, which are in turn controlled by a synchronizer control circuit 48. As will be seen from a further description, the synchronizer control circuit 48 senses certain electrical conditions of the motor field and applies energy to the field supply circuit 22 and thus the exciter windings 24, 26 at such time as a preselected slip frequency is sensed. Accordingly, when the preselected slip frequency is sensed, the contacts 46 are closed and the coil 42 is energized. It is to be understood that contacts 34, 40 and 46 are symbolically represented and may include any combination of electromechanical, electronic or semiconductor switching devices.

Accordingly, the current being fed from the field supply circuit 22 to the exciter field 24 is magnetically coupled through the exciter airgap to the three phase armature windings 26, and is supplied to the motor 12 through a common conductor 50, the motor field winding 14 in a direction from the bottom to the top of the winding, through a controlled rectifier 52, as will be more fully explained hereinafter, and back to the armature winding 26 through the rectifying system 28.

From the foregoing, it is seen that the field supply circuit 22 remains idle until such time as the synchronizer control senses certain preselected conditions and closes contacts 46 to energize relay 42. The energization of the relay 42 closes main contacts 40 to provide electrical energy to the exciter field winding by means of conductors 53, 54.

The foregoing description explains the operation of the system of FIG. 1 during synchronous operation of the motor wherein energy is flowing from the field supply 22 to the motor field winding 14 in a direction from the exciter field winding 24 to the exciter armature windings 26. During startup, however, it will be seen that the energy flows from the motor field winding 14 to the exciter field winding 24 to provide a signal to the synchronizer control circuit 48 which is indicative of the slip condition of the synchronous motor.

Assuming the synchronous motor is at rest, and is ready for startup, the main contacts 20 are closed to provide electrical energy to the motor armature windings 16. During initial startup, the controlled rectifier 52 is rendered nonconductive by a discharge resistance control circuit 60 thereby placing a discharge control resistor 62 into series circuit with the motor field winding 14. Also, a second controlled rectifier 64 is pulsed into the conductive and nonconductive states by means of a startup control circuit 66 such that the control rectifier 64 is nonconductive when current flows from the lower end of the motor field winding 14 to the upper end thereof, hereinafter referred to as the positive half cycle, and is conductive during the opposite half cycle, or negative half cycle, of current flow through the motor field winding 14.

With the motor armature winding 16 energized, the rotor, including field winding 14, will start to rotate and the synchronous motor will start up as an induction motor. During startup, the positive half cycle of current will flow through resistor 62, through the rectifier system 28, including diodes 68, 70, 72, through the exciter armature windings 26 including the respective individual windings 74, 76, 78 back to the opposite side of the winding 14 through conductor 50. During the negative half cycle, current will flow from the upper end of winding 14 to the lower end thereof, through controlled rectifier 64 and through discharge resistor 62 back to the field winding 14.

Thus, during each revolution of the shaft of the synchronous motor, and thus the motor field windings 14 and exciter armature windings 26, current will flow during the positive half cycle through the armature windings 26 and during the negative half cycle through the controlled rectifier 64 shorting the motor field windings 14. As was stated above, the exciter field windings 24 are magnetically coupled with the windings 26, thus inducing a current in windings 24 due to the current flow through windings 26 and the rotation of the shaft. This current flow causes a signal to appear across conductors 53, 54 as shown at 80.

The fundamental frequency of signal 80 is directly related to the slip frequency of the synchronous motor and the individual pulses within portion A are related to the relative number of poles of the exciter field as compared to the motor field 14. The off time or portion B is equal to one-half of the period of the slip frequency of the synchronous motor during the inductive operation. It is to be noted that the slip frequency decreases as the rotor of the synchronous motor is accelerated and this slip frequency starts at very near line frequency and is decreased to very near zero frequency at such time as the synchronous motor approaches synchronous speed.

The synchronizer control circuit 48 is adapted to sense the off time or B portion of the signal 80 and provide an output control signal to close contacts 46 at such time as the duration of portion B exceeds a preselected period and also a subsequent pulse in A portion is sensed. In the particular arrangement disclosed, the synchronizer control circuit 48 may be set to sense a particular threshold of pulse in portion A such that the contacts 46 will be closed either on the first or a subsequent pulse in portion A which reaches the preselected threshold value. As stated above, the period of B is related to the slip frequency and increases in duration as the slip frequency approaches zero when the motor approaches synchronous speed. The synchronizer control circuit 48 is adjustable to select a particular slip frequency at which the control circuit 48 will close contacts 46. The energization of the field supply circuit applies exciter field current to the motor field winding 14 through the exciter windings 24, 26. In this way, the synchronous motor is pulled into synchronism when the speed of rotation of the shaft of the motor very nearly equals synchronous speed, or when a speed has been reached at which the motor can synchronize upon application of exciter energy.

If the exciter energy has been applied to the motor field winding 14 with the proper pose presented, the synchronous motor will pull in and operate at synchronous speed. However, if the application of the exciter field is made during the negative half cycle, the controlled rectifier 64 will be pulsed by means of a sensing circuit in the startup control circuit 66 so that the exciter armature current is short circuited through the controlled rectifier 64. This short-circuited exciter current will cause a transient condition to be reflected back to the field winding 24. This transient condition is sensed by the synchronizer control circuit, as will be more fully explained hereinafter, and will cause the relay contacts 46 to open to deenergize the relay coil 42 and the field supply circuit 22. Upon the occurrence of this condition, the system will again attempt to synchronize in the manner described above. Similarly, if the synchronous motor is overloaded or the field excitation from the exciter is insufficient to maintain synchronism, the synchronous motor will slip a pole and a similar situation will occur wherein a transient condition is sensed to drop out the exciter energy and the system will again synchronize in the manner described above.

FIG. 2 illustrates the specific circuit details of the startup control circuit 66 and the following description illustrates the operation of control circuit 66 both during the startup portion of the operation and the synchronous running portion of the operation. Specifically, the controlled rectifier 64 is provided with a firing circuit 88 which includes a plurality of resistors 90, 92, 94, a diac semiconductor device 96 and a current limiting resistor 98 connected between the conductor 50 and a conductor 100. A noise suppression circuit 102 is provided to eliminate any substantial noise spikes from the controlled rectifier firing circuit 88.

When energy is being fed from the motor field winding 14 in the positive direction, the main field 14 will produce a positive cathode to anode voltage and the drop across the armature windings 26 will produce a negative gate to cathode signal which is limited by a diode 108 connected in the suppressor circuit 102. These conditions will render control rectifier in the nonconductive state and current will flow through the armature windings 26 as described above. When the current through field winding 14 reverses and is in the negative direction, a positive anode to cathode voltage is impressed across controlled rectifier 64 and a positive gate to cathode signal is generated across resistor 98. The diac element 96 establishes a threshold voltage at which this positive gate to cathode signal will be fed to the gate electrode of controlled rectifier 64.

Under these conditions, the controlled rectifier 64 will be rendered conductive to provide a short circuit path for the current flowing in the field windings 14. Accordingly, negligible current will flow through the armature windings 26. Thus, the controlled rectifier 64 is pulsed on during the negative half cycle of current flow in field winding 14 and is rendered nonconductive during the positive half cycle.

During the period when energy is being fed from the armature windings 26 to the field windings 14, the controlled rectifier 64 is rendered nonconductive. This energy flow condition is sensed by means of differentially connected pairs of diodes which includes diodes 106, 108, 110 connected in differential arrangement with respective diodes 68, 70, 72. Accordingly, when current is flowing from the armature windings 26 through the conductor 50 and upwardly from the lower end of field winding 14 to the upper end thereof, current also will flow through selected combinations of resistors 90, 92, 94 and through diodes 106, 108, 110 back to the windings 26. Current flows in diode 106 from selected resistors 90, 92 and 94 and in diode 68 from main field winding 14.

The diode 106 carries a relatively small current as compared to diode 68, carrying the major portion of the motor field current. The signal being fed to the gate-cathode circuit of controlled rectifier 64 is through a circuit including the anode-cathode path of diode 106 and the cathode-anode path of diode 68. Since the voltage drops across diode 68 and 108 are essentially equal, the gate to cathode signal is approximately zero and renders controlled rectifier 64 nonconductive, particularly since diac 96 has a threshold voltage. It is to be noted that the diodes 106 and 68, 108 and 70, and 110 and 72 are differentially connected to impress the gate to cathode signal on control rectifier 64 during their respective conductive periods.

Accordingly, the controlled rectifier 64 is automatically pulsed to the conductive state during the negative half cycle of energy being fed from the field winding 14 and is automatically pulsed off during the positive half cycle from field winding 14. The rectifier 64 is automatically maintained in the nonconductive state during all operations of the system when energy is being fed normally from armature winding 26.

A thyrite device 116 is connected across the conductors 50, 100 to suppress any large voltage spikes which appear across these conductors as a protective measure for the various elements of the circuit. Also, a variable connection, representatively illustrated as selector switch 118, is provided to select various combinations of resistors 90, 92, 94 which are connected in circuit with the gate firing circuit 88. This enables the user to maintain a constant operation of controlled rectifier 64 with variations in exciter voltages in the event various rated exciter units are utilized.

FIG. 3 illustrates the circuit details of the discharge resistance control which is adapted to control the conduction or nonconduction and thus the short circuiting or nonshort circuiting of the discharge resistor 62 during the synchronous operation or startup operation, respectively. The controlled rectifier 52 determines whether the current path will be through discharge resistor 62 or through the controlled rectifier 52. During the startup period it is desired to have the controlled rectifier 52 in the nonconductive state thereby forcing the current to flow through the discharge resistor 62 and during the synchronous running state of the synchronous motor it is desired to have the controlled rectifier 52 in the conductive state to short out the discharge resistor 62.

Two conditions are required to fire the controlled rectifier 52 and they are: (a) positive anode to cathode voltage across controlled rectifier 52 and (b) the conductive state of a second controlled rectifier 126. The controlled rectifier 126 is rendered conductive when a positive anode to cathode voltage exists across controlled rectifier 126 and a positive gate to cathode voltage exists to fire the controlled rectifier 126. Both of these conditions occur when electrical energy is being fed from the exciter armature windings 26 to the main field winding 14. Thus it is seen that current flow through conductor 50, up through winding 14 and back to the windings 26 by means of conductor 100 and rectifiers 68 and 70 and 72 will cause both controlled rectifiers 52 and 126 to conduct. The firing circuit for controlled rectifier 126 includes resistors 130, 132 and the anode-cathode circuit of controlled rectifier 126 includes variable resistor switching circuit 134, selected ones of resistors 136, 138 and resistors 140, 142.

Accordingly, when current flows upwardly through resistor 130 and to the left through resistor 132, the gate to cathode circuit of controlled rectifier 126 will be forward biased. Similarly, the anode to cathode circuit of controlled rectifier 126 will be forward biased when current flows through conductor 50, winding 14, switch 134, and certain ones of resistors 136, 138, 140, 142 back to windings 26. With controlled rectifier 126 in the conductive state, resistor 142 will provide a positive gate to cathode voltage for controlled rectifier 52 and the drop across discharge resistor 62 will provide a positive anode to cathode voltage across controlled rectifier 52. The above-named conditions having been satisfied, controlled rectifier 52 will be rendered conductive to short discharge resistor 62.

During the period that energy is being fed from field winding 14 to exciter armature windings 26, that is, during the startup stage, the controlled rectifier 52 is rendered nonconductive. In analyzing the current flow, it is seen that positive current flow provides a positive anode to cathode voltage for controlled rectifier 52, as will there be a positive anode to cathode voltage for controlled rectifier 126. However, the biasing gate to cathode voltage will be negative for controlled rectifier 126 in that current flow through resistors 132 and 130 will be from left to right to back bias the gate to cathode circuit of the controlled rectifier 126.

During the negative half cycle, current will flow through winding 14 and up through controlled rectifier 64 and back through discharge resistor 62. Also current flows from conductor 50, through resistors 130 and 132, and discharge resistor 62 back to winding 14. This will provide a positive gate to cathode voltage to fire controlled rectifier 126. However, the voltage drop across discharge resistor 62 will appear as a negative anode to cathode voltage across both controlled rectifiers 52 and 126 to maintain the controlled rectifiers 52, 126 in the nonconductive state. Thus, the rectifier 52 will only fire during the period that energy is being fed from the exciter armature windings 26 to the field windings 14.

FIG. 4 illustrates the combined circuit details of FIGS. 2 and 3 and also illustrates the circuits of FIGS. 2 and 3 with the variable resistor switching circuits 118 and 134 removed. In this situation, the resistors 90, 92, 94 and 136, 138, 140 have been replaced by fix resistors 150 and 152, respectively. This circuit may be provided where the voltage of the exciter is known or where suitable fix resistors are substituted in accordance with the particular exciter voltage. It is to be noted that a diode 154 is connected in the gate cathode circuit of controlled rectifier 126 to limit the reverse voltage impressed across these electrodes, thus protecting the controlled rectifier device 126.

FIG. 5 illustrates the nonrotating portion of the overall control system wherein the signal across the exciter field winding 24 is sensed and utilized to control the application of the field power supply to the exciter field winding 24. Specifically, a detector circuit 160 is provided to sense the pulses during portion A of the input waveform from the exciter field winding, and provision is made for adjusting the pulse detection level of the detector circuit by means of a sensitivity knob 162. The output of the detector circuit 160 is fed to an amplifier circuit 164 which converts the pulses detected in the detector circuit 160 to uniform voltage magnitude pulses. It is to be understood that the amplifier circuit 164 may be somewhat threshold voltage responsive and thus may respond only to input pulses above a preselected magnitude. The output of the amplifier circuit 164 is utilized to control the energization and deenergization of the relay 264 through the remaining circuits to be described. The coil 264, when energized and closing contact 46, energizes the field power supply circuit 22 which, in turn, provides direct current energy to the output exciter field winding 24 through connections which are not shown in FIG. 5. The energization of the coil 264 is controlled by means of a pair of controlled rectifiers 166, 168 which are connected in an "AND" gate configuration.

Specifically, the output from the amplifier takes the form of a series of constant amplitude pulses which occur during the A portion of the wave pulse discussed in conjunction with FIG. 1, and an off period which corresponds to the B portion of the waveform of FIG. 1. The off portion or B portion of the wave is timed by means of a slip detector timer circuit 174 which includes an adjustment 176 to vary the timeout period of the timer circuit 174. The slip detector timer circuit 174 is reset with each incoming A period pulse from the amplifier circuit. If the off time is of longer duration than the timeout period selected by the slip detector adjustment knob 176, then the circuit 174 will time out and provide an output firing pulse on gate conductor 180. This pulse on gate conductor 180 causes controlled rectifier 168 to fire and complete a path from field power supply circuit 122 through a resistor 182, coil 264, a second resistor 184 (the controlled rectifier 166 being normally in the nonconductive state), through the controlled rectifier 168 back to the field power supply circuit 122.

The conduction of controlled rectifier 168 causes a small current to flow in coil 264, this current being insufficient, however, to pull in the relay associated with coil 264. However, the next pulse during the A portion of the waveform will cause control rectifier 166 to fire due to the direct connection from the amplifier to a gate conductor 188 through conductor 190. The conduction of controlled rectifier 166 shorts out the current limiting resistor 184, thus increasing the current flow through the path including the coil 264 and controlled rectifiers 166, 168. This current is sufficient to pull in the relay associated with coil 264 to connect the field power supply to the exciter field coil 24. Relay coil 264, in addition to contact 46, includes a pair of contacts 194 which are connected in series circuit between the coil 264 and the power supply 122 and forms a holding circuit for the relay coil 264. The closing of contacts 194 also effects the cutoff of controlled rectifiers 166 and 168 due to the reduction of the voltage across these controlled rectifiers to substantially zero.

In the event the system goes into self-sync operation, that is, where the system is exactly synchronized and the slip frequency is zero, a self-sync override circuit 200 is utilized to provide the actuating pulse for controlled rectifier 166. In this situation it will be noted that the slip frequency drops to zero which permits the slip detector timer circuit 174 to time out and fire the controlled rectifier 166. However, the waveform through the exciter circuit stays at a zero level thereby eliminating any further pulses to the detector circuit 160. From the foregoing discussion, it is to be noted that the pulse following timeout of the slip detector timer circuit 174 causes the controlled rectifier 166 to fire due to the pulse appearing on conductor 190. If this pulse does not appear on conductor 190 for a period of five seconds, the self-sync override circuit 200 will provide the output pulse to gate conductor 188. This five second delay is selected purely for illustrative purposes and it is to be understood that any desired delay may be incorporated into the override circuit 200.

A trip-off circuit 202 is provided to fire a third controlled rectifier device 204, this latter controlled rectifier device 204 being connected in shunting relation with the coil 264. Accordingly, when the controlled rectifier device 204 is fired, the voltage across the coil 264 will drop to very nearly zero, and the relay associated with coil 264 will drop out. The deenergization of the coil 264 causes holding contacts 194 to open and the entire system is rendered in a condition for restarting. As will be seen from a description of FIG. 6, the trip-off circuit is disabled during the period that the relay coil 264 is deenergized. Upon the energization of the coil 264, the trip-off circuit 202 is enabled to permit an output signal on gate conductor 206 to fire controlled rectifier device 204 after a preselected delay has lapsed.

The trip-off circuit 202 is rendered responsive to an input pulse from the amplifier circuit 164, and it is this input pulse which fires controlled rectifier 204 to drop out the relay. In order to prevent the relay from dropping out immediately after it is energized, the above-mentioned time delay is introduced into the trip-off circuit 202 before the circuit can provide an output pulse on conductor 206. This time delay is started by the energization of relay coil 264 and, in the preferred embodiment, is a one-half second delay.

Thus, if fault occurs in the circuit and is generated as a transient pulse through the detector circuit 160 and amplifier circuit 164, and also occurs one-half of a second after the energization of the relay coil 264, a pulse will be generated to fire controlled rectifier 204 and deenergize the coil 264. A normal fault which would occur is a pole slipping condition when the motor is overloaded or a condition wherein the exciter current is insufficient to maintain synchronism of the motor 12. In this situation, a transient condition would be generated, which transient condition is reflected back into the detector circuit through the exciter field coil 24.

FIG. 6 illustrates the various circuit details contained within the block diagrams discussed in conjunction with the description of FIG. 5. Specifically, the signal current flowing in the exciter field winding 24 is also flowing in an inductive element 210 connected in series therewith. This input signal, having the waveform 80 described in conjunction with FIG. 1, is fed through a potentiometer 212 to the input stage of an amplifier circuit 214. The signal, in the form of an AC voltage, is developed across potentiometer 212 from the field winding 24 during portion A of wave 80. The signal is half wave rectified by means of a diode 220 and fed to the amplifier circuit 214. It is to be noted that, with the contact 40 closed and the field applied, a DC voltage appears across the resistor portion of potentiometer 212. This DC voltage is due to the energy being fed to the exciter field 24. A portion of this voltage, the voltage between the upper end of the potentiometer 212 and the arm thereof, provides a signal that the instantaneous voltage of winding 24 must exceed in order to permit diode 220 to conduct. A sensitivity adjustment function is therefore provided by varying the voltage discussed in conjunction with potentiometer 212.

The amplifier circuit 214 includes a driver transistor 216 and a main transistor 218. The input signal from potentiometer 212 is fed through the diode 220 to the base circuit of the transistor 216 by means of resistors 222, 224 and 226. The transistor 216 is connected to a source of direct current potential at point A by means of a conductor 230 and a resistor 232, the transistor 216 being in the normally nonconductive state.

The base circuit of the transistor 218 is connected to the collector electrode of transistor 216 by means of a resistor 234, the transistor 218 being normally nonconductive until such time as the transistor 216 is rendered to the conductive state. Upon the sensing of an input pulse, the transistor 216 commences conduction to cause transistor 218 to conduct. A positive feedback loop is connected from the collector electrode of transistor 218 to the base electrode of transistor 216, including a current limiting resistor 240, to drive transistor 218 into saturation. Upon the removal of the input pulse from the base circuit of transistor 216, the transistors 216, 218 will be rendered to the nonconductive state.

The output of transistor 218, particularly the voltage at the collector electrode thereof, is fed to the circuits 174, 200 and 202 described in conjunction with FIG. 5, and also to controlled rectifier 166 through a diode 266. Particularly, the output signal is fed to the circuit 174 by means of a conductor 242. The timing circuit within circuit 174 includes a pair of resistors 244, 246 and a capacitor 248 which is connected to be charged from a source of positive potential at point B. The capacitor 248 is shunted by an input stage transistor 250, the collector-emitter circuit of which is connected across the capacitor 248. When the transistor 250 is in the nonconductive state, its normal state, the capacitor 248 is permitted to charge through the circuit including the resistors 244 and 246. When the transistor 250 is rendered conductive, the charge on capacitor 248 is rapidly discharged, the resistor 252 being relatively small, through the collector-emitter path of transistor 250 to reset the timing circuit.

However, if a pulse is absent from the input circuit to transistor 250 for a preselected time, the voltage across the capacitor builds up sufficiently to fire a unijunction transistor 254. The time period for firing the unijunction transistor 254 is set by means of the adjustability feature of the resistor 244. The effect of adjusting resistor 244 is to adjust timeout period, and thus the slip frequency at which the circuit will respond. The firing of unijunction 254 creates the output pulse on gate conductor 180 described in conjunction with FIG. 6. As stated above, the conduction of controlled rectifier 168 merely permits a relatively small current to flow through a circuit including resistors 258, 260, coil 264, resistor 184 and controlled rectifier 168. This current is insufficient to pull in the relay associated with coil 264.

Each incoming pulse from transistor 218 resets the timing circuit contained in control circuit 174. Accordingly, once the circuit is timed out, the next pulse into the circuit 174 will reset the timing circuit contained therein. However, a gate pulse is not necessary to maintain the conductive state of controlled rectifier 168. This resetting pulse is also fed to the input circuit of controlled rectifier 166 by means of a diode 266 and resistor 268. Thus the controlled rectifier 166 is rendered to the conductive state to short the resistor 184. Under these conditions, a low impedance path is provided for the current flow through the coil 264 to pull in the contacts associated therewith, as for example the contacts 46 connected in controlling relation with coil 42, which connects the source of input electrical energy to a rectifier circuit 270. The coil 264 also controls the holding contacts 194 to maintain a low impedance current path for the coil 264. The closure of contacts 194 lowers the voltage across controlled rectifiers 166, 168 to turn these rectifiers off once the coil 264 is energized. The closure of contacts 46 energizes coil 42 which, in turn, closes contacts 40.

As stated above, a condition may occur wherein the synchronous motor will go into self-synchronizing mode (self-sync) wherein the slip frequency immediately drops to zero. Under these circumstances, the timing circuit contained within control circuit 174 will time out and fire unijunction transistor 254 and, ultimately, controlled rectifier 168. However, the zero condition at the input stage to the amplifier circuit 214 will preclude the generation of any further pulses to be fed through diode 266 to controlled rectifier 166. Accordingly, the self-sync override timer circuit 200 is provided to generate the firing pulse for controlled rectifier 166. The timing circuit is substantially identical to the circuit described in conjunction with control circuit 174 in that there is included a timing circuit having an adjustable resistor 280, a fixed resistor 282 and a capacitor 284 forming the timing circuit. The input pulses to the timing circuit are fed through a transistor 286 and a current limit resistor 288. The circuit has been adjusted to time out at the end of five seconds in the preferred embodiment, this timing being adjusted by means of resistor 280. Accordingly, if a pulse is absent from the input circuit to transistor 286 for five seconds, the timing circuit, including capacitor 284, will time out to fire unijunction transistor 290. The unijunction transistor is connected to the gate electrode of controlled rectifier 166 by means of a diode 292 to fire the controlled rectifier 166 at the end of five seconds.

After the exciter energy is applied to the motor field and the machine is running synchronously, a fault may occur in the operation of the machine. In this circumstance, it is desired to automatically remove the field excitation from the machine in response to the fault condition. As stated above, a fault condition is reflected back through the exciter windings and the magnetic coupling thereof to the nonrotating portion of the control circuitry. This fault signal results in the signal being transmitted through the amplifier circuit 214, which amplifies squares and feeds the fault pulse to the trip-off circuit 202.

The trip-off circuit 202 is devised to discriminate between the pulses being fed to the sensing system during the A portion of the waveform 80 and the fault condition pulse by disabling the trip-off circuit for a preselected period after the coil 42 is energized. In this way, the train of pulses being generated during A portion of the waveform 80 will not immediately deenergize the coil 42, once it is energized in response to the timing out of the time circuit contained in control circuit 174 and the subsequent pulse fed to controlled rectifier 166.

The timing circuit within trip-off circuit 202 includes a resistor 296 and a capacitor 298, the parameters of the timing circuit being selected to achieve a preselected charging voltage at node 300 after a delay of one-half of a second after the energization of the coil 42. With the coil 42 in the deenergized state, the capacitor 298 is short circuited by a normally closed pair of contacts 302, the contacts being controlled by the coil 42. The contacts 302 being closed maintains the capacitor in the discharged state, and when the coil 42 is energized, the contacts 302 are opened to permit capacitor 298 to charge. The node 300 is connected to the emitter circuit of a unijunction transistor 306, the unijunction transistor 306 being rendered responsive to a voltage at node 300 which is equal to the charge voltage of capacitor 298 after one-half second charging period. The base 1 and base 2 circuit of unijunction 306 is connected in an "AND" configuration with a transistor 310, the emitter of the transistor 310 being connected to the gate electrode of control rectifier 204.

Accordingly, when the capacitor is charged sufficiently to fire unijunction transistor 306 and a subsequent abnormal condition or fault pulse is sensed by transistor 310 through diode 312, a current path is provided from node 300 (positive end of capacitor 298), through the emitter-base 1 circuit of unijunction transistor 306, the collector-emitter circuit of transistor 310, resistor 318 to the negative side of capacitor 298. The flow of current through this circuit provides a firing pulse to controlled rectifier 204 to cause the controlled rectifier 204 to conduct. It is to be noted that the controlled rectifier 204 is connected in shunting relation to the coil 264, the conduction of the controlled rectifier 204 lowering the voltage across coil 264 to cause the relay associated therewith to drop out. The deenergization of the coil 264 opens holding contacts 194 thus returning the sensing circuit to its original startup condition with the exciter deenergized and the synchronous motor field winding deenergized.

The circuit of FIG. 6 also includes a power supply circuit 320 which includes a resistor 322 and zener diode 324 connected across the rectified power supply 270. Accordingly, an unregulated voltage is supplied from point A at 326 to point A connected to conductor 230 described above. Similarly, a regulated direct current potential connected to point B at 328 is connected to point B, of each of the circuits 174 and 200. Various protective and voltage suppression networks are provided in the circuit, the operation of which is deemed to be obvious.

FIG. 7 illustrates the specific details of the power supply system as it is controlled from the relay coil 264. Particularly, a source of alternating current potential is impressed across conductors 340, 342 and this voltage is impressed on variac 36. The output of the variac is fed by means of a variable connection including an arm 344 to a rectifier bridge 346 by means of normally open contacts 40. As stated above, the contacts 40 are controlled by the operation of the relay 42, which in turn is controlled by contact 46 and relay coil 264 in the synchronizer control circuit 48.

The output of the bridge 346 is filtered by means of a capacitor 348 and is fed to the exciter field winding 24. The detector portion 350 of the synchronizer control circuit is illustrated as sensing the signal across winding 24 and also across the inductor 210, the inductor 210 being the same inductor as was discussed in conjunction with FIG. 6.

FIG. 8 illustrates one mode of interconnecting the nonrotating circuits of the present invention. The signal from winding 24 is fed to the inductor 210 which, in the preferred embodiment, is fabricated of four inductors connected, in conjunction with winding 24, across the direct current power supply. It is to be understood that one or any number of inductors may be utilized. The synchronizer control circuit is connected to sense the various signals across the winding 24 and the inductances 210. The synchronizer control utilizes the detected signals to actuate the set of contacts 46 connected in series circuit with the relay coil 42. A plurality of auxiliary contacts, including normally closed contacts 352, 354 and normally open contacts 356, 358, are actuated in response to the energization of the coil 42. Thus a plurality of external signals are provided for signaling or control purposes in response to the application of exciter energy to the synchronous motor.

FIG. 9 is a flow diagram illustrating the operating sequences of the synchronous motor unit under various conditions of operation. The ideal situation is where the motor is driven directly from the startup mode to the EFP applied mode wherein the exciter field power is applied to instigate synchronous operation of the machine. However, various other operations could occur where the field is not applied or drops out due to a particular condition within the machine. In the first situation, wherein the exciter field is not applied, one possible remedy is to increase the slip sensitivity such that the machine does not have to achieve as high a degree of percent of synchronism in the inductive start mode.

Under the second circumstance, the exciter field power is applied but drops out. The field may drop out for various reasons, as for example insufficient excitation field current, the sensitivity of the sensing control circuit is too great or the preselected slip frequency is too great. As is seen from the flow diagram, remedies include increasing the excitation field current, reducing the sensitivity or reducing the slip, respectively, as the case may be. It is possible that the field could drop out for a combination of reasons. Accordingly, a procedure may be set up for testing which of the procedures is most likely to achieve the desired results.

Another possibility is the machine will go into self-sync application of the exciter field power, as described above, and the field may be lost due to various conditions, as for example the conductive condition of controlled rectifier 64 shorting the exciter armature windings 26 or due to the fact that the sensitivity is set too high. In this situation the system either restarts in the normal fashion or again returns to the self-sync application of the exciter field power. In the case of the loss of the exciter field power due to too great a sensitivity, the remedial action is to reduce the sensitivity prior to the restarting operation.

As a final consideration, the loss of the exciter field power may be dropped out due to the loss of synchronism (slippage of poles). This condition may occur when the machine is either overloaded or the exciter field energy is insufficient to maintain synchronism. In this event the field is again applied through the normal starting operations.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. In a brushless synchronous motor unit including a rotating motor winding, and a stationary motor winding, an exciter unit coupled to the motor unit including a rotating exciter winding and a stationary exciter winding, a control system for controlling the synchronous operation of the motor unit by controlling the application of electrical energy from the exciter unit to the motor unit, said control system being fixedly supported relative to the stationary motor winding, and means for magnetically coupling said control system to one of said rotating windings.

2. The control system of claim 1 wherein said control system is magnetically coupled to sense motor operations through the airgap formed by the exciter unit windings.

3. The control system of claim 1 further including an exciter electrical energy supply system electrically connected to the exciter stationary winding, a synchronizer control sensor circuit for sensing preselected conditions of said synchronous motor unit, and switch means controlled by said sensor circuit for energizing said stationary winding from said energy supply system.

4. The control system of claim 3 wherein said control system is magnetically coupled to sense said preselected motor conditions magnetically through the airgap formed by the exciter unit windings.

5. In the synchronous motor unit of claim 4 wherein the motor unit is started rotating as an induction motor, the control system further including that said preselected conditions includes the slip frequency of the synchronous motor unit, and said synchronizer sensor circuit has means for preselecting a slip frequency and means for comparing the sensed slip frequency to the said preselected frequency.

6. The control system of claim 5 wherein said slip frequency is at least partially reflected through said airgap as a zero frequency signal for a period, said period being a function of one-half of the electrical cyclic operation of the motor unit.

7. The control system of claim 6 wherein said slip frequency is further reflected through said airgap as a plurality of pulses during another period, said another period being a function of the remaining half of the electrical cyclic operation, and said pulses being related to the numerical relationship between the number of exciter poles an motor poles.

8. In the synchronous motor unit of claim 5, a startup control circuit for controlling the flow path of energy in the rotating windings during the inductive startup means for forcing the flow of energy from the rotating motor winding to the rotating exciter winding during one portion of the cyclic operation of the motor unit and substantially shunting the flow of energy from the rotating motor winding to the rotating exciter winding during another portion of the cyclic operation.

9. The startup control circuit of claim 8 wherein said one portion is one-half electrical cycle of operation of said motor unit and said another portion is the other half cycle of operation.

10. In the synchronous motor and exciter unit of claim 1, a discharge impedance control circuit, said discharge impedance control circuit including impedance means and impedance control means for sensing startup of the motor unit, said impedance means being adapted to be switched into circuit with said motor rotating winding during startup of the motor unit in response to said impedance control means.

11. The control system of claim 1 further including a synchronizer control sensor circuit for sensing said motor operations, said motor operations including the speed of rotation of the rotating motor winding.

12. The control system of claim 11 wherein said motor operations includes the polarity of the induced field current due to the rotation of the rotating motor windings.

13. The control system of claim 11 further comprising adjustment control means including said synchronizer control sensor circuit for permitting adjustment of the operating conditions of the motor unit during rotation of the rotating motor winding.

14. A method of operating a brushless synchronous motor unit including a rotating motor winding, and a stationary motor winding and an airgap, an exciter unit coupled to the motor unit including a rotating exciter winding a stationary exciter winding and an airgap and a control system for controlling the synchronous operation of the motor unit by controlling the application of electrical energy from the exciter unit to the motor unit, said control system being fixedly supported relative to the stationary motor winding the method comprising the steps of magnetically coupling said control system to one of said rotating windings through one of the airgaps to sense an operating condition of the motor unit and controlling the operation of the motor unit in response to the sensed condition.

15. The method of claim 14 wherein the step of magnetically coupling the control system to sense motor operations includes coupling the control system through the airgap formed by the exciter unit windings.

16. The method of claim 14 further including the step of electrically connecting an exciter electrical energy supply system to the exciter stationary winding, sensing preselected conditions of the synchronous motor unit, and energizing the exciter stationary winding from said energy supply system in response to said preselected conditions.

17. The method of claim 16 wherein said preselected motor conditions are sensed magnetically through the airgap formed by the exciter unit windings.

18. In the synchronous motor unit of claim 17, the method further including the steps of starting the motor unit rotating as an induction motor, sensing the slip frequency of the synchronous motor unit as a preselected condition, preselecting a slip frequency and comparing the sensed slip frequency to the said preselected frequency to energize the stationary exciter winding.

19. The method of claim 18 wherein said slip frequency is at least partially reflected through said airgap as a zero frequency signal for a period, said period being a function of one-half of the electrical cyclic operation of the motor unit.

20. The method of claim 19 wherein said slip frequency is further reflected through said airgap as a plurality of pulses during another period, said another period being a function of the remaining half of the electrical cyclic operation, and said pulses being related to the numerical relationship between the number of exciter poles and motor poles.

21. In the synchronous motor unit of claim 18, the method further including the step of controlling the flow path of energy in the rotating windings during the inductive startup means for forcing the flow of energy from the rotating motor winding to the rotating exciter winding during one portion of the cyclic operation of the motor unit and substantially shunting the flow of energy from the rotating motor winding to the rotating exciter winding during another portion of the cyclic operation.

22. The method of claim 21, wherein said one portion is one-half electrical cycle of operation of said motor unit and said another portion is the other half cycle of operation.

23. In the synchronous motor and exciter unit of claim 14, the method including providing a discharge impedance control circuit including impedance means and impedance control means for sensing startup of the motor unit, and switching said impedance means into circuit with said motor rotating winding during startup of the motor unit.

24. In a synchronous motor unit having a stationary winding, a rotating wind, and an exciter unit having a rotating winding electrically connected to the motor rotating winding and a stationary winding, the motor unit being adapted to be operated in a startup mode wherein electrical energy is fed from the motor rotating winding to the exciter rotating winding and a running mode wherein electrical energy is fed from the exciter rotating winding to the motor rotating winding, a synchronizer control circuit coupled to the motor rotating winding for controlling the application of electrical energy from the exciter unit to the motor unit during the startup mode, the motor unit generating a signal wave during the startup mode having a zero current characteristic which has a duration varying as a function of the slip frequency of the motor unit during the startup mode and a second characteristic, a slip frequency sensing circuit having means for preselecting a comparison slip frequency reference and timing said zero current characteristic duration, said slip frequency sensing circuit generating a control signal when said sensed duration bears a preselected relationship to said preselected slip frequency reference and switching means for applying exciter energy to the motor unit in response to said control signal and said second characteristic, said second characteristic resetting said slip frequency sensing circuit when said duration is less than an amount selectable by said slip frequency reference.

25. The synchronizer control circuit of claim 24 wherein said second characteristic includes at least one pulse differing in amplitude from said first characteristic.

26. A method of operating a brushless synchronous motor unit including a rotating motor winding, a stationary motor winding and an airgap, an exciter unit coupled to the motor unit including a rotating exciter winding, a stationary exciter winding and an airgap, and a control system for controlling the synchronous operation of the motor unit by controlling the application of electrical energy from the exciter unit to the motor unit, the control system being fixedly supported relative to the stationary motor winding the method comprising the steps of magnetically coupling said control system to one of said rotating windings through one of the airgaps, generating a signal in the said one rotating windings indicative of the relationship of the speed of the motor rotating winding relative to synchronous speed, and applying energy from the exciter unit to the motor unit in response to said signal bearing a preselected relationship to synchronous speed.